US010118356B2

(12) United States Patent
Marchini et al.

(10) Patent No.: US 10,118,356 B2
(45) Date of Patent: Nov. 6, 2018

(54) APPARATUS FOR MANUFACTURING TYRES FOR VEHICLE WHEELS

(71) Applicant: Pirelli Tyre S.p.A., Milan (IT)

(72) Inventors: Maurizio Marchini, Milan (IT); Michele Ballabio, Milan (IT); Christian De Col, Sedico (IT)

(73) Assignee: PIRELLI TYRE S.P.A., Milan (IT)

(*) Notice: Subject to any disclaimer, the term of this patent is extended or adjusted under 35 U.S.C. 154(b) by 299 days.

(21) Appl. No.: 14/926,955

(22) Filed: Oct. 29, 2015

(65) Prior Publication Data
US 2016/0144584 A1    May 26, 2016

Related U.S. Application Data

(62) Division of application No. 14/365,366, filed as application No. PCT/IB2012/057518 on Dec. 20, 2012, now Pat. No. 9,205,614.
(Continued)

(30) Foreign Application Priority Data

Dec. 22, 2011  (IT) ............................... MI2011A2349

(51) Int. Cl.
*B29D 30/30* (2006.01)
*B29D 30/16* (2006.01)
*B29D 30/08* (2006.01)

(52) U.S. Cl.
CPC ....... *B29D 30/3057* (2013.01); *B29D 30/165* (2013.01); *B29D 30/1657* (2013.01);
(Continued)

(58) Field of Classification Search
CPC ............. B29D 30/1642; B29D 30/165; B29D 30/1657; B29D 30/3042; B29D 30/305;
(Continued)

(56) References Cited

U.S. PATENT DOCUMENTS 3,874,974 A   4/1975 Simmons, Jr.
3,904,471 A   9/1975 Kubinski
(Continued)

FOREIGN PATENT DOCUMENTS

CN   102245374 A   11/2011
EP   0 956 940     11/1999
(Continued)

OTHER PUBLICATIONS

International Search Report from the European Patent Office for corresponding International Application No. PCT/IB2012/057518, dated Apr. 19, 2013.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

Building the carcass structure of tyres for vehicle wheels includes associating, at each end edge of a carcass ply, at least one respective annular reinforcement structure formed by depositing along a circumferential direction a plurality of reinforcement elements having a first length. Such elements are cut to size from a reinforced continuous band-like element fed to a cutting group arranged at a first operative position adapted to allow a barycentric grip of the reinforcement elements. The cutting group can translate along a feeding direction of the band-like element to a second operative position for cutting to size a plurality of second reinforcement elements having a second length different from the first length. The second operative position is defined on the basis of the second length, so as to have a barycentric grip of the second reinforcement elements too.

5 Claims, 5 Drawing Sheets

Related U.S. Application Data

(60) Provisional application No. 61/580,937, filed on Dec. 28, 2011.

(52) U.S. Cl.
CPC ....... *B29D 30/305* (2013.01); *B29D 30/3042* (2013.01); *B29D 2030/082* (2013.01); *B29D 2030/3085* (2013.01); *B29D 2030/3092* (2013.01)

(58) Field of Classification Search
CPC ................ B29D 30/3057; B29D 30/46; B29D 2030/082; B29D 2030/1685; B29D 2030/1692; B29D 2030/3085; B29D 2030/3092; B29D 2030/463
See application file for complete search history.

(56) References Cited

U.S. PATENT DOCUMENTS

| | | | |
|---|---|---|---|
| 5,145,542 A | 9/1992 | Tanaka et al. | |
| 9,168,702 B2 | 10/2015 | Eli-Eli et al. | |
| 2002/0088528 A1 | 7/2002 | Usami et al. | |
| 2008/0196817 A1 | 8/2008 | Mancini | |
| 2010/0024949 A1 | 2/2010 | Mancini et al. | |
| 2010/0043950 A1 | 2/2010 | Marchini et al. | |
| 2010/0101704 A1 | 4/2010 | Amurri et al. | |
| 2011/0240208 A1 | 10/2011 | Marchini | |

FOREIGN PATENT DOCUMENTS

| | | |
|---|---|---|
| WO | WO 2008/001152 A1 | 1/2008 |
| WO | WO 2008/077418 A1 | 7/2008 |
| WO | WO 2010/067139 A1 | 6/2010 |

OTHER PUBLICATIONS

Written Opinion of the International Search Authority from the European Patent Office for corresponding International Application No. PCT/IB2012/057518, dated Apr. 19, 2013.

Office Action issued by the State Intellectual Property Office of the People's Republic of China on Nov. 27 2015, in corresponding Application No. CN 201280069540.4.

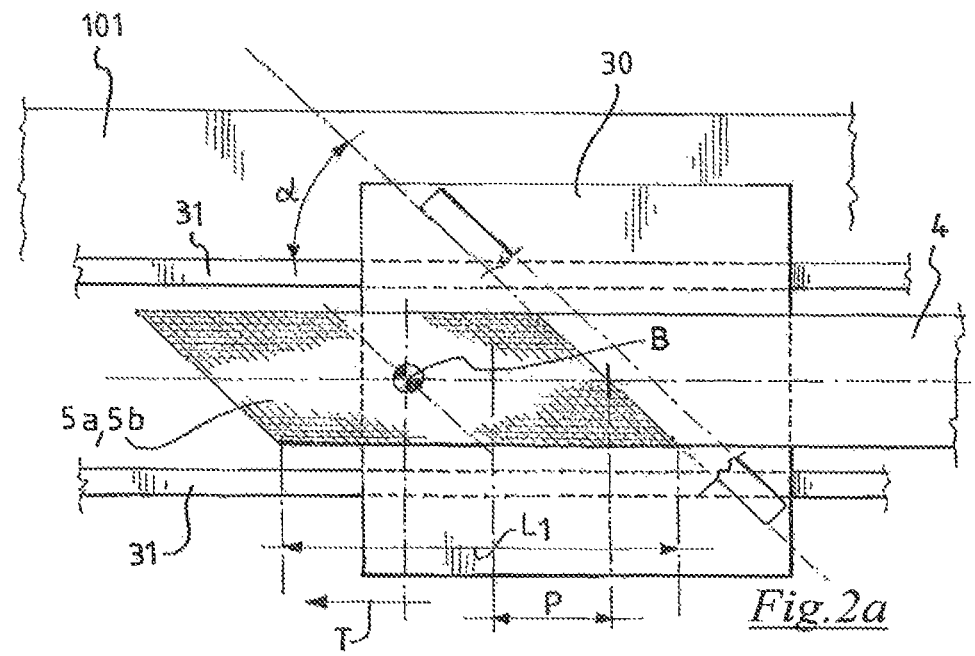
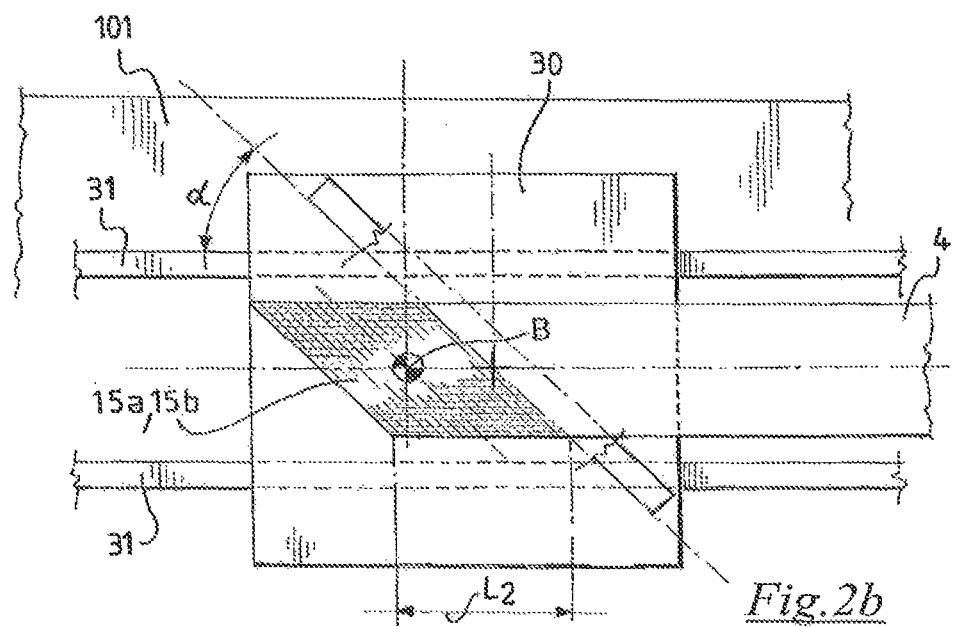

APPARATUS FOR MANUFACTURING TYRES FOR VEHICLE WHEELS

CROSS REFERENCE TO RELATED APPLICATIONS

This application is a division of U.S. application Ser. No. 14/365,366, filed Jun. 13, 2014, which is a national phase application based on PCT/IB2012/057518, filed Dec. 20, 2012, and claims the priority of Italian Patent Application No. MI2011A002349, filed Dec. 22, 2011, and the benefit of U.S. Provisional Application No. 61/580,937, filed Dec. 28, 2011, the content of each application being incorporated herein by reference.

BACKGROUND OF THE INVENTION

Field of the Invention

The present invention relates to a process and an apparatus for manufacturing tyres for vehicle wheels, in particular for manufacturing tyres different from each other.

The present invention further relates to an apparatus for manufacturing at least one reinforcement structure on a tyre component formed on a forming support, such apparatus being usable for manufacturing tyres for vehicle wheels, in particular tyres different from each other.

Description of the Related Art

A tyre for vehicle wheels generally comprises a carcass structure comprising at least one carcass ply formed of reinforcing cords embedded in an elastomeric matrix. The carcass ply has end edges respectively engaged with annular anchoring structures. The latter are arranged in the areas of the tyre usually identified by the name "beads" and each of them is normally formed by a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre coming out from such a seat.

At the beads specific reinforcing structures may be provided having the function of improving the torque transmission to the tyre.

In a radially outer position with respect to the carcass ply a belt structure comprising one or more belt layers is associated, said belt layers being arranged radially one on top of the other and having textile or metallic reinforcing cords with crossed orientation and/or an orientation substantially parallel to the direction of circumferential extension of the tyre.

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread band is applied, also made of elastomeric material.

Between the tread band and the belt structure a so-called "under-layer" of elastomeric material can be arranged, said under-layer having properties suitable for ensuring a steady union of the tread band itself.

On the side surfaces of the carcass structure respective sidewalls of elastomeric material are also applied, each extending from one of the side edges of the tread band up to the respective annular anchoring structure to the beads.

The traditional processes for manufacturing tyres for vehicle wheels essentially provide for the components of the tyre listed above to be first made separately from one another, to be then assembled on at least one building drum.

However, the current tendency is that of using manufacturing processes that allow the manufacturing and storage of semi-finished parts to be minimised or possibly eliminated.

Attention has now turned towards process solutions that allow the individual components of the tyre to be made by directly building them, according to a predetermined sequence, onto a forming support, typically toroidal or cylindrical.

The term "reinforced continuous band-like element" is used to indicate a continuous element comprising one or more thread-like reinforcing elements, such as textile or metal cords, substantially parallel to one another and embedded in a matrix of elastomeric material or coated with a layer of elastomeric material.

Preferably, such reinforcing cords extend parallel to each other along the direction of longitudinal extension of the same reinforced continuous band-like element.

A cutting to size of said reinforced continuous band-like element, fed along a feeding direction, generates a "reinforcing element".

"Cutting length" is defined as the measure of said reinforcement element along said feeding direction of the reinforced continuous band-like element.

The term: "elastomeric material" is used to indicate a composition comprising at least one elastomeric polymer and at least one reinforcing filler. Preferably, such a composition further comprises additives such as, for example, a cross-linking agent and/or a plasticizer. Thanks to the provision of the cross-linking agent, such material may be cross linked by heating, so as to make the end product.

The terms "radial" and "axial" and the expressions "radially inner/outer" and "axially inner/outer" are used with reference to the radial direction and to the axial direction of a forming support used for building a specific tyre component. The terms "circumferential" and "circumferentially" instead, are used referring to the annular extension of the forming support.

The expression "tyre component" is used to indicate any structural element of a tyre, or even just a portion of such structural element, which is suitable for carrying out a specific function when the tyre is used in a running vehicle. Such component may be for example the liner, the under-liner, the abrasion-proof element, the bead core, the bead filler, the carcass ply, the belt strip, the under-belt layer, the under-layer of the tread band, the sidewall inserts, the sidewalls, the tread band, the reinforcement inserts, etc.

The expression "barycentric grip condition" and/or "barycentric position" is used to indicate a condition and/or position wherein the reinforcement element is gripped or held at a surface portion thereof extending symmetrically on opposite sides with respect to the barycentre of the reinforcement element.

EP 0 956 940 describes a process for manufacturing a reinforcement layer in a tyre being formed on a forming support. Such reinforcement layer is obtained by sequentially depositing a plurality of reinforcement elements on the forming support, along a circumferential direction of an outer peripheral surface thereof. Such reinforcement elements are cut to size in a proper cutting group from a reinforcement band-like element. Subsequent to the cut, each reinforcement element is picked up by proper gripping members and deposited on the outer peripheral surface of the forming support.

WO 2010/067139 describes a process for manufacturing tyres for vehicle wheels, wherein a reinforcement annular structure is associated at each one of the axially opposite end edges of a carcass ply deposited on a substantially cylindrical forming support, such annular reinforcement structure being obtained by deposition on the carcass ply of a plurality of reinforcement elements cut to size from a reinforced continuous band-like element fed in the proximity of the forming support. Each reinforcement element, once cut to size, is picked up by a gripping member for the subsequent deposition on the carcass ply. In particular, in a preferred embodiment, the gripping member transfers the reinforcement element to a positioning member which in turn deposits it on the respective end edge of the carcass ply.

SUMMARY OF THE INVENTION

The Applicant has found that in the processes of the type described in WO 2010/067139, in order to ensure an accurate and repeatable deposition of all the reinforcement elements on a tyre component (for example on the end edges of the carcass ply) deposited on a forming support, it is preferable setting the apparatus so that the pickup of the reinforcement element from the cutting group by the gripping member and the transfer of the reinforcement element from the gripping member to the positioning member takes place at respective barycentric positions of the individual reinforcement elements.

However, the Applicant has noted that since the above pickup and transfer positions are fixed in the space once the tyre manufacturing apparatus has been set, whenever it is necessary to change the cutting length of the reinforcement element (such as for manufacturing a batch of tyres having a different fitting diameter and/or a number of reinforcement elements other than that of the previously manufactured batch of tyres), it is necessary to first provide for a new set up of the apparatus. This is because, otherwise, the pickup of the reinforcement element from the cutting group by the gripping member and the transfer of the same reinforcement element from the gripping member to the positioning member would not take place at respective barycentric positions of the individual reinforcement elements.

The Applicant has observed that the above working conditions do not ensure a deposition of the reinforcement elements on a tyre component (for example on the end edges of the carcass ply) according to the project design; this would imply repeated manual corrections of the apparatus setup at each variation of the reinforcement element geometry.

Since such setup requires the accurate adjustment of the relative positions between the gripping member and the positioning member, it is quite burdensome in terms of labour cost and manufacturing time.

The Applicant has therefore perceived the need of simplifying the apparatus setup operation as much as possible whenever it is necessary to change the cutting length of the reinforcement elements, ensuring at the same time that such simplification does not impair the correct positioning of the reinforcement elements on the tyre component (for example on the end edge of the carcass ply) deposited on the forming support.

To this end, the Applicant has perceived that, upon variation of the cutting length of the reinforcement elements, it is possible to obtain an accurate and repeatable deposition condition of the reinforcement elements by intervening in the setup step on only one of the apparatus devices and/or members, and in particular on the cutting group only.

Finally, the Applicant has found that by translating each time the cutting group along the feeding direction of the reinforced continuous band-like element by a length which is variable on the basis of the extent of the cutting length variation each time required, it is possible to always ensure the desired barycentric grip condition of the reinforcement elements by the gripping member at the cutting group. More in detail, the desired barycentric position of the reinforcement element is kept also when the reinforcement element is transferred from the gripping member to the positioning member, thus obtaining an accurate and repeatable deposition of the reinforcement elements on the tyre component (for example on the end edge of the carcass ply) deposited on the forming support.

More in particular, the Applicant has found that once the cutting group has been positioned along the feeding direction of the reinforced continuous band-like element at a first operative position defined according to a first cutting length of the reinforcement elements, when it is desired to switch to a second cutting length different from the first cutting length it is possible to keep the desired barycentric grip condition of the reinforcement elements by translating the cutting group along the above feeding direction up to a second operative position defined on the basis of the above second cutting length.

Therefore, in a first aspect thereof, the present invention relates to a process for manufacturing tyres for vehicle wheels, comprising associating at least one reinforcement structure with at least one tyre component formed on a forming support. Associating said at least one reinforcement structure comprises at least one of the following actions:

feeding a reinforced continuous band-like element at a cutting group by moving it along a feeding direction with a first advancing step, said cutting group being arranged along the feeding direction in a first operative position;

cutting to size the reinforced continuous band-like element to form at least one first reinforcement element having a first cutting length;

depositing said at least one first reinforcement element on a respective deposition area defined on a respective component of a first tyre;

translating the cutting group along the feeding direction from said first operative position to a second operative position;

moving the reinforced continuous band-like element along the feeding direction with a second advancing step different from the first advancing step;

cutting to size the reinforced continuous band-like element to form at least one second reinforcement element having at least one second cutting length different from said first cutting length;

depositing said at least one second reinforcement element on a respective deposition area defined on a respective component of a second tyre;

wherein said second operative position is defined on the basis of said at least one second cutting length.

The Applicant believes that since the process of the present invention provides for a gripping condition of the reinforcement elements in a barycentric position, it advantageously allows, in a very simple and effective manner (thus without any burden in terms of labour cost and manufacturing time) an accurate and repeatable deposition condition on the tyre component to be maintained as the cutting length of the above reinforcement elements changes.

In a second aspect thereof, the present invention relates to an apparatus for building at least one reinforcement structure on a tyre component formed on a forming support. Said apparatus may comprise:
- a device for feeding a reinforced continuous band-like element along a feeding direction;
- a cutting group of the reinforced continuous band-like element to form at least one first reinforcement element and at least one second reinforcement element having a first cutting length and at least one second cutting length that is different from said first cutting length, respectively;
- at least one moving and depositing device for moving said at least one first reinforcement element and at least one second reinforcement element close to the forming support and depositing said at least one first reinforcement element and at least one second reinforcement element on respective deposition areas defined on respective tyre components;
- a device for controlling the translation of said cutting group along said feeding direction between a first operative position defined on the basis of said first cutting length and a second operative position defined on the basis of said at least one second cutting length.

In a third aspect thereof, the present invention relates to an apparatus for manufacturing tyres for vehicle wheels comprising an apparatus for building at least one reinforcement structure as described above.

The present invention, in at least one of the above aspects thereof, can comprise at least one of the following preferred features.

Preferably, the second operative position is far from the first operative position by a distance whose extension, along the feeding direction, is defined on the basis of the difference between said at least one second cutting length and said first cutting length.

More preferably, said extension is equal, in absolute value, to half the difference between said at least one second cutting length and said first cutting length.

Even more preferably, translating the cutting group comprises:
- moving the cutting group along the feeding direction away from or towards the barycentre of said at least one first reinforcement element, respectively, depending on whether said at least one second cutting length is greater or smaller than said first cutting length, respectively.

Advantageously, the above provisions allow the desired barycentric grip of the reinforcement elements to always be achieved irrespective of the extent of the required cutting length variation.

In preferred embodiments of the present invention, depositing said at least one first reinforcement element comprises:
- moving said at least one first reinforcement element from the cutting group towards the forming support;
- positioning said at least one first reinforcement element on the respective deposition area.

Advantageously, said positioning takes place always in the desired circumferentially symmetrical position with respect to a radial plane of the forming support.

Preferably, moving said at least one first reinforcement element comprises:
- picking said at least one first reinforcement element up from the cutting group through a gripping member and moving it up to a transfer position of said at least one first reinforcement element to a positioning member.

Preferably, positioning said at least one first reinforcement element comprises:
- bringing, through the positioning member, said at least one first reinforcement element up to a deposition position defined at the forming support;
- depositing said at least one first reinforcement element on the respective deposition area.

In preferred embodiments of the present invention, depositing said at least one second reinforcement element comprises:
- moving said at least one second reinforcement element from the cutting group towards the forming support;
- positioning said at least one second reinforcement element on the respective deposition area.

Preferably, moving said at least one second reinforcement element from the cutting group towards the forming support comprises:
- picking said at least one second reinforcement element up from the cutting group through said gripping member and moving it up to said transfer position to said positioning member.

Preferably, positioning said at least one second reinforcement element comprises:
- bringing, through the positioning member, said at least one second reinforcement element up to said deposition position defined at the forming support;
- depositing said at least one second reinforcement element on the respective deposition area.

Preferably, picking said at least one first reinforcement element and at least one second reinforcement element up from the cutting group through said gripping member comprises:
- positioning said gripping member at a barycentric position of said first reinforcement element and second reinforcement element;
- holding the respective reinforcement element in said barycentric position.

Preferably, the transfer of each reinforcement element from the gripping member to the positioning member is carried out at the barycentric position of said reinforcement element.

Preferably, said at least one tyre component is at least one carcass ply.

Preferably, said respective deposition area is defined on an end edge of said at least one carcass ply.

In preferred embodiments of the present invention, the cutting group is mounted on a support frame through the interposition of a sliding rail extending along said feeding direction.

Such sliding rail advantageously allows the movement of the cutting group in the most appropriate operative position on the basis of the required cutting length.

Preferably, said at least one moving and depositing device comprises:
- at least one gripping member of said at least one first reinforcement element and at least one second reinforcement element, said at least one gripping member being movable between the cutting group and a transfer position.

Preferably, said at least one moving and depositing device further comprises:
- at least one positioning member which is movable between said transfer position and a deposition position defined at the forming support.

In preferred embodiments thereof, the apparatus comprises two positioning members arranged on opposite sides with respect to a middle plane of said apparatus.

Advantageously, the middle plane of the apparatus of the present invention corresponds to an axial symmetry plane of the tyre being formed, i.e. to the equatorial plane of the tyre.

Preferably, the forming support is substantially cylindrical.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings:

FIG. 2a is a simplified schematic plan view of a cutting group of the apparatus of FIG. 1 in a first working position thereof;

FIG. 2b is a simplified schematic plan view of the cutting group of the apparatus of FIG. 1 in a second working position thereof;

In FIG. 1, reference numeral 100 globally indicates an exemplary embodiment of an apparatus for manufacturing tyres for vehicle wheels according to the present invention.

Figure 1:
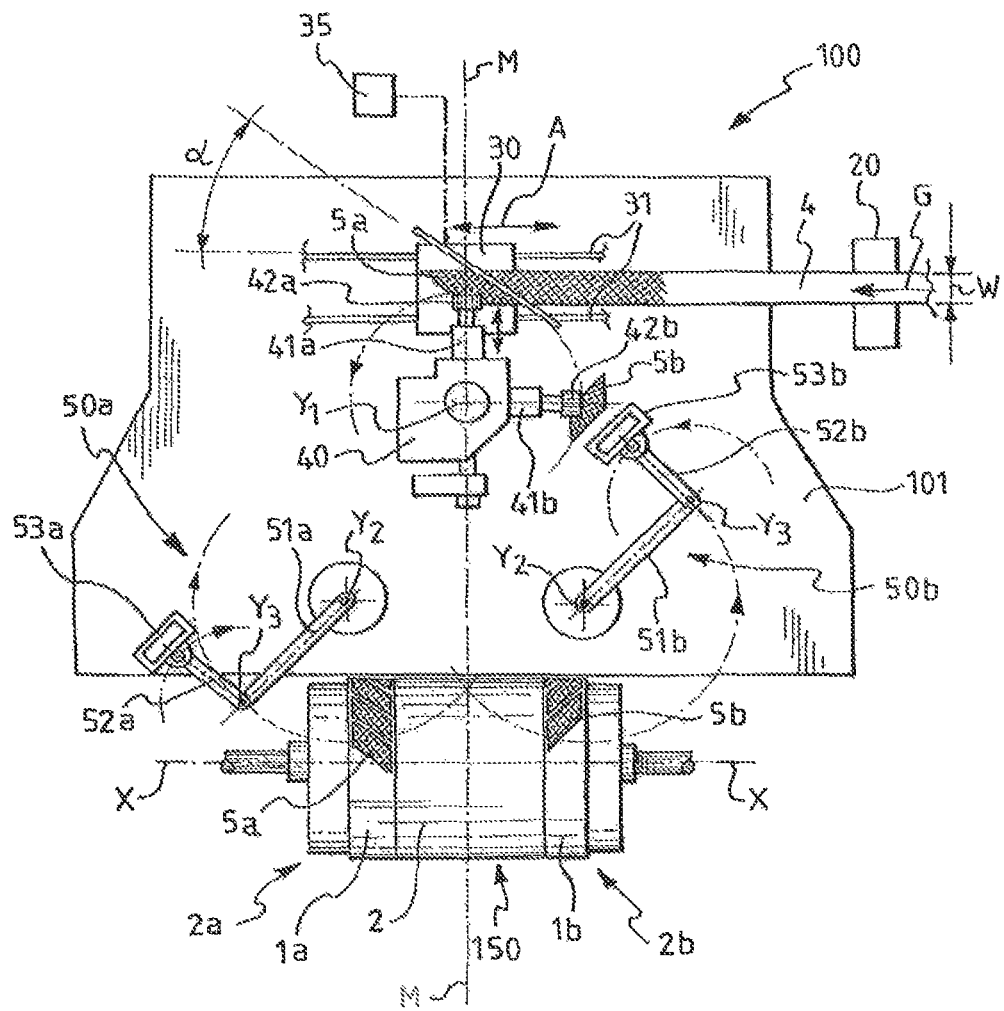
FIG. 1 is a simplified schematic plan view of an apparatus for manufacturing tyres for vehicle wheels according to the present invention, in an operative configuration thereof.

Preferably, apparatus 100 may be used in a process for manufacturing different batches of tyres.

More preferably, apparatus 100 allows associating respective reinforcement structures to specific tyre components.

DETAILED DESCRIPTION OF THE INVENTION

In the specific embodiment illustrated herein, apparatus 100 is used for building carcass structures. Such building in particular comprises forming a first annular reinforcement structure 1a, 1b at each end edge 2a, 2b of a first carcass ply 2 deposited on a forming support 150 for manufacturing a first batch of tyres, and forming an annular reinforcement structure 1a, 1b at each end edge 2a, 2b of a second carcass ply 2' deposited on the forming support 150, for manufacturing a second batch of tyres differing from the tyres of the first batch at least by the width of the reinforcement structure and/or the deposition angle of the reinforcement element on the end edge of the carcass ply. Preferably, the forming support 150 is cylindrical.

The above end edges 2a, 2b are defined at axial end zones of the carcass ply 2, 2' configured to define the bead region of the tyres.

Throughout the present description, reference shall first be made to the building of the reinforcement structures 1a, 1b on a first carcass ply 2 for manufacturing the first batch of tyres.

Each reinforcement structure 1a, 1b extends in a circumferential direction on the respective end edge 2a, 2b of the carcass ply 2 and is defined by a predetermined number of reinforcement elements 5a, 5b, having the same length L1 and width W, deposited one after the other on respective deposition areas defined on the opposite end edges 2a, 2b of the carcass ply 2.

In particular, FIG. 1 shows a reinforcement structure in being formed through deposition of the reinforcement elements 5a at the end edge 2a of the carcass ply 2 and a reinforcement structure 1b being formed through deposition of the reinforcement elements 5b at the opposite end edge 2b of the carcass ply 2.

Apparatus 100 comprises a support frame 101 whereto, in operation, the forming support 150 is moved close and on which the various members or devices needed for forming the reinforcement structures 1a, 1b are mounted.

In order to allow the subsequent deposition in circumferential direction of the reinforcement elements 5a, 5b, the forming support 150 is periodically controlled in rotation about the axis of rotation X-X thereof by an angle corresponding to a predetermined circumferential step.

The reinforcement elements 5a, 5b are preferably obtained by operations of cutting to size at least one reinforced continuous band-like element 4 extending along a direction of longitudinal extension, indicated with letter G in FIG. 1, and fed close to the forming support 150 through a proper feeding device 20.

The reinforced continuous band-like element 4 has a defined and constant width W, preferably comprised between 1 and 100 mm, more preferably between 30 and 70 mm.

The reinforced continuous band-like element 4 is fed along the direction G of longitudinal extension thereof by the feeding device 20 with a predetermined advancing step, such step defining a predetermined cutting length L1 of the reinforced continuous band-like element 4, which corresponds to a predetermined width of the reinforcement elements 5a, 5b when they are deposited on the forming support 150.

The expressions "direction of longitudinal extension" and "feeding direction" shall be used without distinction to refer to the same direction indicated with letter G in FIG. 1.

Apparatus 100 comprises a cutting group 30 configured to carry out the sequential operations of cutting to size the reinforced continuous band-like element 4 for obtaining the reinforcing elements 5a, 5b in a sequence.

The cutting group 30 acts on the continuous reinforced band-like element 4, with a predetermined cutting frequency, along a cutting direction defining, on the lying plane of the reinforced continuous band-like element 4, a predetermined cutting angle α with the direction G of longitudinal extension of the reinforced continuous band-like element 4.

In the preferred embodiments of the present invention, the cutting angle α is set to a value greater than zero, preferably comprised between about 15° and about 90° more preferably between about 20° and about 50°, even more preferably between about 22° and about 45°.

If the cutting angle α is equal to 90°, length L1 of the reinforcement elements 5a, 5b deposited on the forming support 150 corresponds to width W of the reinforced continuous band-like element 4. If the cutting angle α is smaller than 90°, length L1 of the reinforcement elements 5a, 5b is equal to width. W of the reinforced continuous band-like element 4 divided by the sine of angle α.

The cutting group 30 is pivoted to frame 101 about a respective axis of rotation and can rotate as a whole around such axis for allowing the cutting of the reinforced continuous band-like element 4 with different angles α.

As shown in FIGS. 1 and 2a, the cutting group 30 is mounted on a pair of sliding rails 31 associated with support frame 101 and extending parallel to the feeding direction G of the reinforced continuous band-like element 4. In this way, the cutting group 30 can translate along the feeding direction G of the reinforced continuous band-like element 4 for positioning at operative positions different from that shown in FIG. 1, thus allowing the cut of reinforcement elements having lengths different from that of the reinforcement elements 5a, 5b.

As shall appear more clearly throughout the present description, the different operative positions of the cutting group 30 are defined on the basis Of the desired cutting length of the reinforcement elements.

In order to control the translation of the cutting group 30 (indicated with double arrow A in FIG. 1) along the feeding direction G, apparatus 100 comprises a proper control device 35 associated with the cutting group 30.

Downstream of the cutting group 30, i.e. between the cutting group 30 and the forming support 150, a moving and depositing device of the reinforcement elements 5a, 5b is provided.

The moving and depositing device in particular comprises a gripping member 40 of the reinforcement elements 5a, 5b.

The gripping member 40 comprises a pair of arms 41a, 41b configured to alternately pick the reinforcement element 5a, 5b just made up to move it towards the respective end edge 2a, 2b of the carcass ply 2 deposited on the forming support 150.

Arms 41a, 41b are fixedly connected to one another and angularly spaced by a predetermined angle, preferably equal to 90°.

Each arm 41a, 41b comprises, at a free end thereof, a clamp 42a, 42b for gripping the reinforcement element 5a, 5b to be cut.

Each clamp 42a, 42b is slidingly mounted on the respective arm 41a, 42b so as to carry out a linear sliding movement with respect to arms 41a, 41b along the respective longitudinal directions. Such movement allows the release of the reinforcement element 5a, 5b just cut from the cutting group 30 for the subsequent movement thereof towards the forming support 150.

Figure 3:
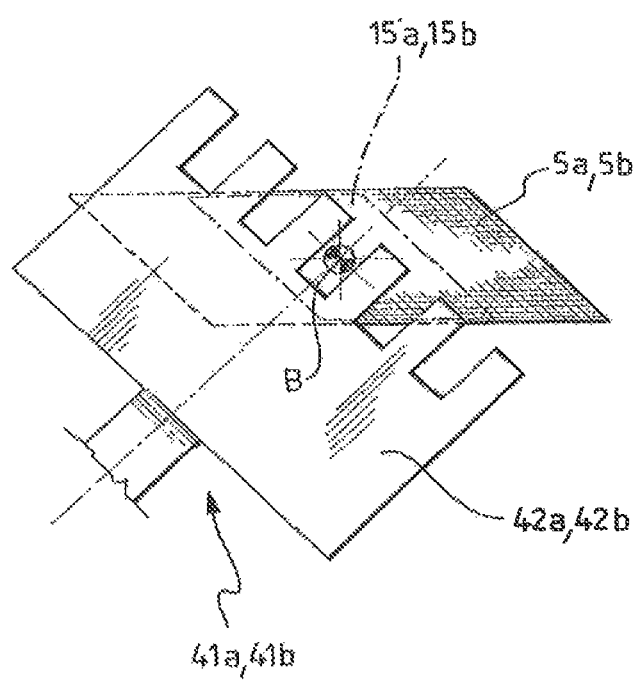
FIG. 3 is a simplified schematic plan view of a gripping member of the apparatus of FIG. 1 in a gripping position of reinforcement elements having different cutting lengths.

The grip of the reinforcement elements 5a, 5b by clamps 42a, 42b takes place at barycentre B of the above reinforcement elements 5a, 5b (i.e. at a barycentric position), as schematically shown in FIGS. 2a and 3.

The gripping member 40 is pivoted to frame 101 around a respective axis of rotation $Y_1$ defined at a plane M of apparatus 100, such plane M corresponding to the equatorial plane of the tyre being formed on the forming support 150.

The gripping member 40 can rotate about axis $Y_1$ in both directions of rotation with an alternating movement, so as to move in an alternating sequence the reinforcement elements 5a towards the end edge 2a of the carcass ply 2 and the reinforcement elements 5b towards the end edge 2b of the carcass ply 2.

The moving and depositing device further comprises, between the gripping member 40 and the forming support 150, a pair of positioning members 50a, 50b, each configured for picking a respective reinforcement element 5a, 5b up from a respective arm 41a, 41b of the gripping member 40 at a respective transfer position after such arm has made a predetermined angular movement (preferably equal to 90°) starting from the cutting group 30.

The positioning members 50a, 50b (which are absolutely identical to one another) are preferably arranged symmetrically on the opposite sides with respect to plane M of apparatus 100 and are moved synchronously with arms 41a, 41b. Each reinforcement element 5a, 5b can thus be transferred by a respective arm 41a, 41b of the gripping member 40 to a respective positioning member 50a, 50b, which then deposits the reinforcement element 5a, 5b on a respective end edge 2a, 2b of the carcass ply 2 deposited on the forming support 150.

Each positioning member 50a, 50b comprises a respective articulated arm in turn comprising a first arm 51a, 51b having a free end pivoted on frame 101 at a pivoting axis $Y_2$, and a second arm 52a, 52b having a free end pivoted at a pivoting axis $Y_3$ on a free end of the respective first arm 51a, 52a opposite the one where the respective first arm 51a, 52a is pivoted to frame 101.

Each second arm 52a, 52b comprises, at a free end thereof opposite the one were the second arm 52a, 52b is pivoted to the first arm 51a, 51b, a respective support member 53a, 53b configured to pick the respective reinforcement element 5a, 5b up from the respective arm 41a, 41b of the gripping member 40 at the above transfer position for moving it to the respective end edge 2a, 2b of the carcass ply 2 deposited on the forming support 150.

The transfer of the reinforcement element 5a, 5b from arm 41a, 41b of the gripping member 40 to the support member 53a, 53b of the positioning member 50a, 50b takes place so that the reinforcement element 5a, 5b is subsequently held by the respective support member 53a, 53b at barycentre B thereof, i.e. at a barycentric position.

Each support member 53a, 53b is provided with a device for holding the reinforcement element 5a, 5b by suction or suction cup or electromagnet (according to whether the reinforcement cords inside the reinforcement elements are textile or metal), configured to prevent the reinforcement element 5a, 5b from falling down during the movement towards the forming support 150.

Each support member 53a, 53b is movable parallel to the pivoting axes $Y_2$ and $Y_3$ for allowing the deposition of the reinforcement elements 5a, 5b on the end edges 2a, 2b of the carcass ply 2 deposited on the forming support 150.

In a preferred embodiment of apparatus 100 of the present invention, such as that illustrated herein, the support members 53a, 53b, after having deposited the reinforcement elements 5a, 5b on the respective end edges 2a, 2b of the carcass ply 2, press such reinforcement elements 5a, 5b against the forming support 150 so as to deform them consistently with the geometry of the forming support 150, thus achieving the complete laying of the reinforcement elements 5a, 5b on the above end edges 2a, 2b.

In an alternative embodiment of apparatus 100 of the present invention, not shown, a pair of respective pressing members configured to press on the reinforcement elements 5a, 5b after they have been deposited by the support members 53a, 53b on the above end edges 2a, 2b are provided downstream of the positioning members 50a, 50b, i.e. between the positioning members 50a, 50b and the forming support 150.

Figure 5:
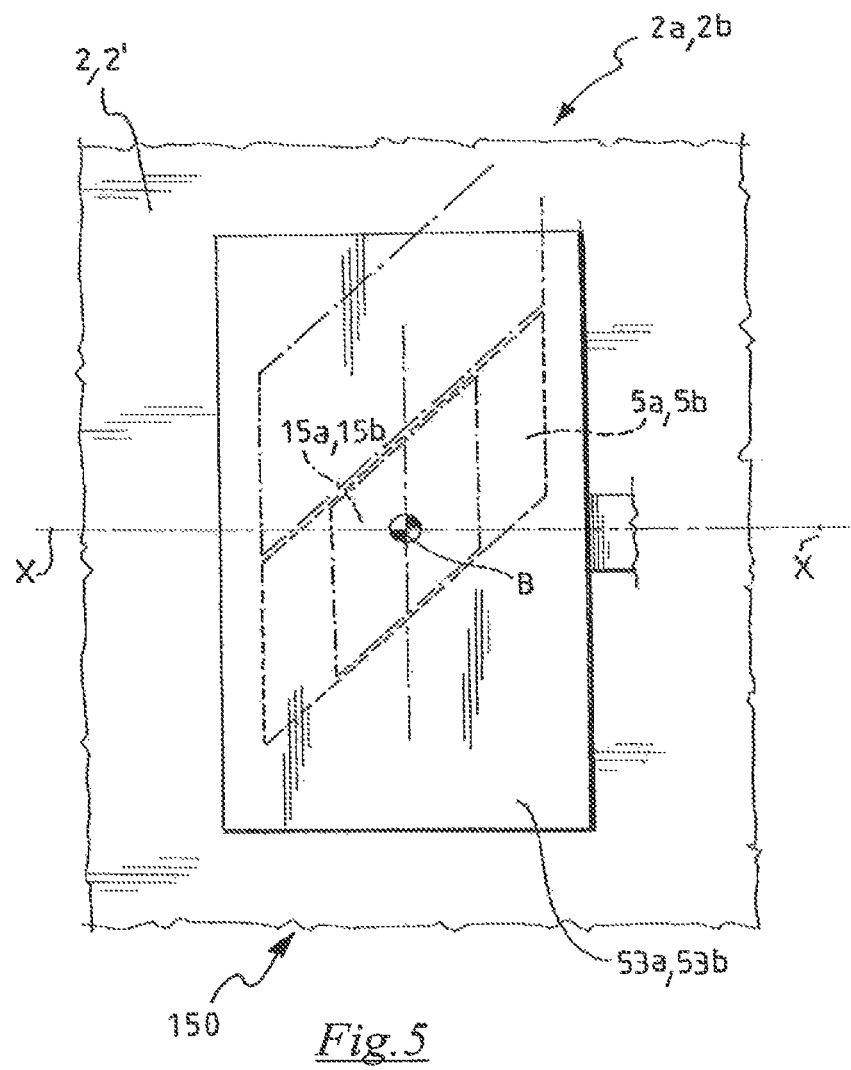
FIG. 5 is a simplified schematic plan view of the positioning member of the apparatus of FIG. 1 in a deposition position of reinforcement elements having a different cutting lengths on a forming support.

Irrespective of the specific embodiment of apparatus 100 being used, the reinforcement elements 5a, 5b are each time deposited on the end edges 2a, 2b at respective deposition areas defined in circumferentially symmetrical positions with respect to a vertical radial plane of the forming support 150, that is so that barycentre B of the reinforcement element 5a, 5b deposited is on said radial plane, as shown in FIG. 5.

Apparatus 100 may further comprise a pair of idle rollers (not shown in the figures) movable perpendicularly to the rotation axis X-X of the forming support 150. Such rollers are coated with a deformable material and are arranged at opposite sides with respect to plane H of apparatus 100, each one in the proximity of a respective positioning member 50a, 50b.

The above rollers are configured to be activated when the respective reinforcement structure 1a, 1b has been completed at each end edge 2a, 2b of the carcass ply 2 for improving the compaction and adhesion of said reinforcement structure 1a, 1b on the carcass ply 2.

With reference to FIG. 1, a preferred embodiment of the process carried out by apparatus 100 described above shall now be described, aimed to the manufacture of a first batch of tyres wherein the reinforcement structures 1a, 1b comprise reinforcement elements 5a, 5b having a predetermined first length L1.

Before starting the above process, a carcass ply 2 is deposited on the forming support 150 and the forming support 150 is moved close to frame 101. Apparatus 100 is then set up on the basis of the features of the tyres to be made.

The setup of apparatus 100 comprises, among the other things, the positioning of the cutting group 30 at the desired cutting angle α with respect to the feeding direction G of the reinforced continuous band-like element 4. The above setup further comprises the positioning of the cutting group 30 in an operative position defined along the feeding direction of the reinforced continuous band-like element 4 on the basis of the desired cutting length L1.

As described above, in the above process the reinforcement elements 5a, 5b are cut in a sequence from the reinforced continuous band-like element 4 and they are alternately deposited each on a respective end edge 2a, 2b of the carcass ply 2. In particular, the deposition of a reinforcement element 5a on an end edge 2a takes place immediately after a reinforcement element 5b has been deposited on the other end edge 2b and vice versa, so as to make a reinforcement structure In on the end edge 2a while another reinforcement structure 1b is made on the end edge 2b.

At the regime state, thus, there is a situation wherein at least one reinforcement element. 5a has already been deposited on the end edge 2a and at least one reinforcement element 5b has already been deposited on the other end edge 2b. Such situation is shown in FIG. 1.

Starting from such situation, the reinforced continuous band-like element 4 is moved along said feeding direction G by a predetermined advancing step. During advancing of the reinforced continuous band-like element 4, gripping member 40 is made to rotate so as to bring arm 41a at the cutting group 30. In this position, arm 41a is activated to pick a free end of the reinforced continuous band-like element 4 up.

Simultaneously with the rotation of the gripping member 40, a synchronous rotation of the positioning member 50a takes place.

Afterwards, the reinforced continuous band-like element 4 is cut to obtain the reinforcement element 5a.

FIG. 1 shows an operative configuration of the apparatus and process of the present invention wherein the reinforcement element 5b just cut has been picked up by clamp 42b of arm 41b of the gripping member 40 and the latter has been moved by about 90° to bring clamp 42b to a transfer position of the reinforcement element 5b to the positioning member 50b which meanwhile has been moved towards the gripping member 40. At the same period of time, arm 41a of the gripping member 40 has been brought at the cutting group 30 for picking up the reinforcement element 5a which is about to be cut from the reinforced continuous band-like element 4.

After the reinforcement element 5b has been transferred from the gripping member 40 to the positioning member 50b, the latter is made to rotate about the pivoting axis $Y_2$ to bring the above reinforcement element 5b at the end edge 2b of the carcass ply 2. During such rotation, the reinforcement element 5b is held at the barycentric position on the support member 53b of the positioning member 50b by the holding device described above.

Meanwhile, the forming support 150 is made to rotate about axis X-X by a predetermined angle corresponding to a movement in the circumferential direction by a length equal to (if the circumferentially consecutive reinforcement elements 5a, 1b must be deposited in contact with each other and without overlapping) or greater than (if the reinforcement elements 5a, 5b must be deposited leaving a free space between two circumferentially consecutive reinforcement elements) the advancing step of the reinforced continuous band-like element 4.

Once the support member 53b is at a radially outer position with respect to the forming support 150, the support member 53b is moved towards the forming support 150 (and thus in a direction perpendicular to the rotation axis X-X of the forming support 150) up to positioning the reinforcement element. 5b on a respective deposition area defined on the end edge 2b of the carcass ply 2.

Subsequently, the support member 53b exerts a predetermined thrust action against the forming support 150, so as to obtain the complete laying of the reinforcement element 5b on the end edge 2b of the carcass ply 2.

As an alternative, said thrust action may be carried out by a pressing member separate from the support member 53b.

The process described above is repeated cyclically through the positioning members 50a and 50b, each time depositing a new reinforcement element 5a, 5b on the respective end edge 2a, 2b of the carcass ply 2, up to completing the reinforcement structures 1a, 1b on both end edges 2a, 2b of the carcass ply 2.

Afterwards, if the idle rollers described above are provided, each one of such idle rollers is brought in contact with the respective reinforcement structure 1a, 1b just formed. The rotation of the forming support 150 is then controlled for at least one full revolution. The action of the rollers during such rotation produces the compaction of the reinforcement structures 1a, 1b on the respective end edges 2a, 2b of the carcass ply 2.

According to the present invention, a process totally similar to that described above may be carried out by the same apparatus 100 for manufacturing a second batch of tyres differing from the tyres of the first batch in that the reinforcement structures 1a, 1b of the tyres of the second batch comprise reinforcement elements 15a, 15b having a cutting length L2 different from the cutting length of the reinforcement elements 5a, 5b of the tyres of the first batch.

Throughout the present description, particular reference is made to the case where length L2 is lower than length L1, as shown in FIG. 2b.

In this case, a carcass ply 2' is deposited on the forming support 150 and the process described above is repeated.

In particular, in order to proceed with the cutting of the reinforcement elements 15a, 15b to the desired length L2, the cutting group 30 is first translated along the feeding direction G of the reinforced continuous band-like element 4 towards barycentre B of the reinforcement elements 5a, 5b previously cut (i.e. in the direction indicated by arrow T in FIG. 2a). In particular, the cutting group 30 is moved from a first operative position taken for cutting the reinforcement elements 5a, 5b having length L1 to a new operative position which is far from the first operative position by a distance P whose longitudinal extension along the feeding direction G is a function of the difference between length L1 and length L2 (FIGS. 2a and 2b).

More in particular, said extension is equal to half the difference between length L1 and length L2.

Of course, if length L2 is greater than length L1, the movement of the cutting group 30 takes place in a direction opposite to that indicated with letter T in FIG. 2 (i.e. away from barycentre of the reinforcement elements 5a, 5b previously cut) and the extent of distance P is equal to half the difference between length L2 and length L1.

Figure 4:
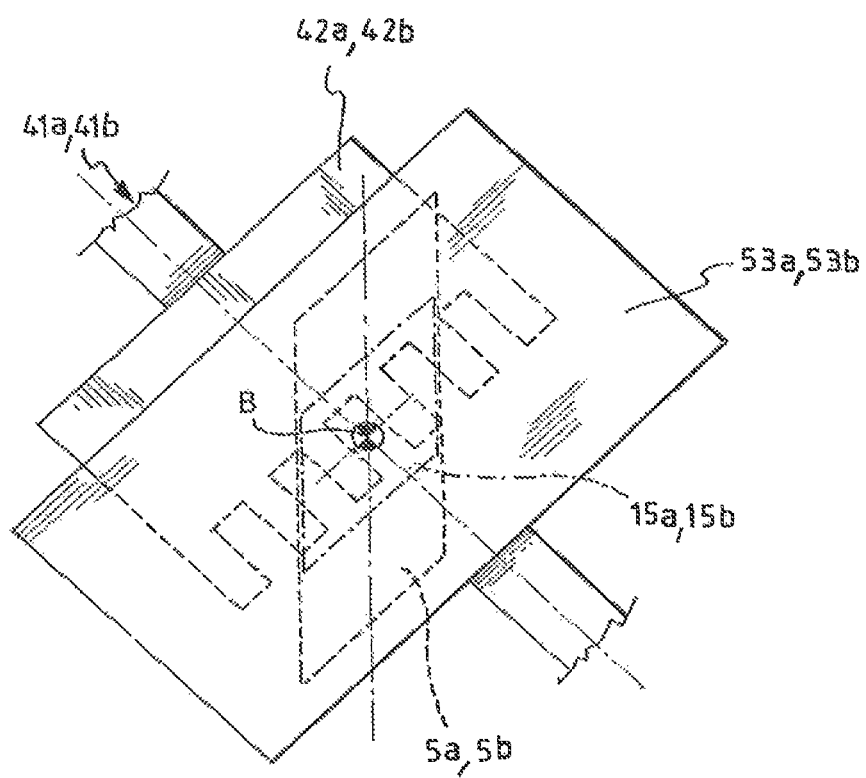
FIG. 4 is a simplified schematic plan view of the gripping member and of a positioning member of the apparatus of FIG. 1 in a transfer position of reinforcement elements having a different cutting lengths from the gripping member to the positioning member.

In this way, it is ensured that the pickup of the reinforcement elements 15a, 15b by clamps 42a, 42b of the gripping member 40 and the transfer of the same to the support members 53a, 53b of the positioning members 50a, 50b always takes place at a barycentric position, as described above with reference to the reinforcement elements 5a, 5b (FIG. 4).

Accordingly, it is ensured that the deposition of the reinforcement elements 15a, 15b on the end edges 2a, 2b of the carcass ply 2' each time takes place at circumferentially symmetrical positions with respect to the vertical radial plane of the forming support 150, as described above with reference to the reinforcement elements 5a, 5b (FIG. 5).

In other words, as shown in FIGS. 3-5, during all the process steps of the present invention the spatial position of barycentre B of the reinforcement elements 15a, 15b always matches that of barycentre B of the reinforcement elements 5a, 5b.

In this way, it is possible to ensure the accurate and repeatable deposition of the reinforcement elements 5a, 5b, 15a, 15b on the end edges 2a, 2b of the carcass plies 2, 2' upon the variation of the cutting length of the reinforcement elements.

Of course, a man skilled in the art can make further modifications and variants to the invention described above in order to satisfy specific and contingent application requirements, these variants and modifications in any case being within the scope of protection as defined by the following claims.

The invention claimed is:

1. An apparatus for building at least one reinforcement structure on a tyre component formed on a forming support, comprising:
   a feeder to feed a reinforced continuous band-like element along a feeding direction;
   a cutting group of the reinforced continuous band-like element translatable along the feeding direction to form at least one first reinforcement element and at least one second reinforcement element having a first cutting length and at least one second cutting length that is different from said first cutting length, respectively;
   at least one moving and depositing device for moving said at least one first reinforcement element and at least one second reinforcement element close to the forming support and depositing said at least one first reinforcement element and at least one second reinforcement element on respective deposition areas defined on respective tyre components, and the at least one moving and depositing device comprises:
       at least one gripping member of said at least one first reinforcement element and said at least one second reinforcement element, said at least one gripping member movable between the cutting group and a transfer position and
       at least one positioning member which is movable between said transfer position and a deposition position defined at the forming support and comprises a support member attachable at a barycentric position of the at least one first reinforcement element and the at least one second reinforcement element; and
   a controller configured to control the translation of said cutting group along said feeding direction between a first operative position defined on a basis of said first cutting length and a second operative position defined on a basis of said at least one second cutting length so that a barycentric grip condition of the at least one first reinforcement element and the at least one second reinforcement element by the gripping member is maintained.

2. The apparatus according to claim 1, wherein the cutting group is mounted on a support frame through an interposition of a sliding rail extending along said feeding direction.

3. The apparatus according to claim 1, comprising two positioning members arranged on opposite sides with respect to a middle plane of said apparatus.

4. The apparatus according to claim 1, wherein said forming support is substantially cylindrical.

5. The apparatus according to claim 1, wherein the apparatus is for manufacturing tyres for vehicle wheels.

* * * * *